US006334017B1

(12) United States Patent
West (10) Patent No.: US 6,334,017 B1
(45) Date of Patent: Dec. 25, 2001

(54) RING PHOTONIC CRYSTAL FIBERS (76) Inventor: James A. West, 1 E. Chatfield Pl., Painted Post, NY (US) 14870

( * ) Notice: Subject to any disclaimer, the term of this patent is extended or adjusted under 35 U.S.C. 154(b) by 0 days.

(21) Appl. No.: 09/426,835

(22) Filed: Oct. 26, 1999

(51) Int. Cl.[7] .............................. G02B 6/16; G02B 6/20
(52) U.S. Cl. ........................................... 385/123; 385/125
(58) Field of Search ..................................... 385/123–128

(56) References Cited

U.S. PATENT DOCUMENTS

| | | | |
|---|---|---|---|
| 5,278,931 | 1/1994 | Antos et al. | 385/126 |
| 5,742,722 * | 4/1998 | Imoto | 385/126 |
| 5,802,236 | 9/1998 | DiGiovanni et al. | 385/127 |
| 5,907,652 | 5/1999 | DiGiovanni et al. | 385/125 |
| 6,097,890 * | 8/2000 | Ranka et al. | 385/127 |

OTHER PUBLICATIONS

T.A. Birks et al., "Dispersion compensation using single-material fibers", IEEE Photonics Technology Letters, vol. 11, No. 6, pp. 674–676, Jun. 1999.*

Photonic crystals: putting a new twist on light; Joannopoulos/Villeneuve/Fan; Mar. 13, 1997; p. 143–149 (Nature).

Endlessly single–mode photonic crystal fiber; Birks/Knight/Russell; (Optics Letters) Jul. 1, 1997; p. 961–963.

Silica/Air Photonic Crystal Fibres; Russell/Knight/Birks/Cregan/Mangan; Jul. 10–11 1997; p. 1–4 (International Workshop on Structure and Functional Optical Properties of Silica and Silica–Related Glasses).

Microscopic Glass Fibre Crystals: the world's longest holes; Russell/Knight/Mangan/Cregan/Birks; 1998; p. 1–2 (no month available).

Properties of photonic cyrstal fiber and the effective index model; Knight/Birks/Russell/Sandro; Mar. 1998; p. 748–752 (J. Opt. Soc. Am.).

"Single–Mode Photonic Band Gap Guidance of Light in Air", Cregan, R. F., et al. Science, vol. 285, Sep. 3, 1999, Pp. 1537–1539.

* cited by examiner

Primary Examiner—Rodney Bovernick
Assistant Examiner—Michael Stahl (57) ABSTRACT A fiber optic waveguide is provided. The fiber optic waveguide includes a core region, and a cladding region surrounding the core region. The cladding region includes an inner cladding region and an outer cladding region. The inner cladding region has a lattice of ring structures. The core region is formed from a high index material and the cladding region is formed from materials producing an effective refractive index lower than the refractive index of the core region.

19 Claims, 4 Drawing Sheets

RING PHOTONIC CRYSTAL FIBERS

BACKGROUND OF THE INVENTION

1. Field of the Invention

The present invention relates generally to a photonic crystal optical waveguide structure for an optical communication system. More particularly, the present invention is directed to a ring photonic crystal optical waveguide fiber structure for creating an endlessly single mode optical waveguide.

2. Technical Background

The investigation of properties of specific optical fiber designs has continued to keep pace with an ever increasing demand for high capacity, long—haul waveguide fiber. Data transmission rates in the terabit range are being studied and communication systems having regenerator spacings greater than 100 km are under consideration. The requirement in the telecommunication industry for greater information capacity over long distances, without regenerators, has led to a reevaluation of single mode fiber index design.

Optical waveguide fibers can be generally classified into single-mode fiber and multimode fiber. Both types of optical fiber rely on total internal reflection (TIR) for guiding the photons along the fiber core. Typically, the core diameter of single-mode fiber is relatively small, thus allowing only a single mode of light wavelengths to propagate along the waveguide. Single-mode fiber can generally provide higher bandwidth because the light pulses can be spaced closer together and are less affected by dispersion along the fiber. Additionally, the rate of power attenuation for the propagating light is lower in a single-mode fiber.

Optical fibers having a larger core diameter are generally classified as multimode fibers, and allow multiple modes of light wavelengths to propagate along the waveguide. The multiple modes travel at different velocities. This difference in group velocities of the modes results in different travel times, causing a broadening of the light pulses propagating along the waveguide. This effect is referred to as modal dispersion, and limits the speed at which the pulses can be transmitted; in turn limiting the bandwidth of multimode fiber. Graded-index multimode fiber (as opposed to step-index multimode fiber) has been developed to limit the effects of modal dispersion. However, current multimode and graded-index multimode fiber designs still do not have the bandwidth capabilities of single-mode fiber.

Photonic crystals are another means by which photons (light modes) can be guided through an optical waveguide structure. Rather than guiding photons using TIR, photonic crystals rely on Bragg scattering for guiding the light. The characteristic defining a photonic crystal structure is the periodicity of dielectric material along one or more axes. Thus, photonic crystals can be one-dimensional, two-dimensional and three-dimensional. These crystals are designed to have photonic band gaps which prevent light from propagating in certain directions within the crystal structure. Generally, photonic crystals are formed from a periodic lattice of dielectric material. When the dielectric constants of the materials forming the lattice are different, and the material absorbs minimal light, the effects of scattering and Bragg diffraction at the lattice interfaces allow the photons to be guided along or through the photonic crystal structure.

Figure 1:
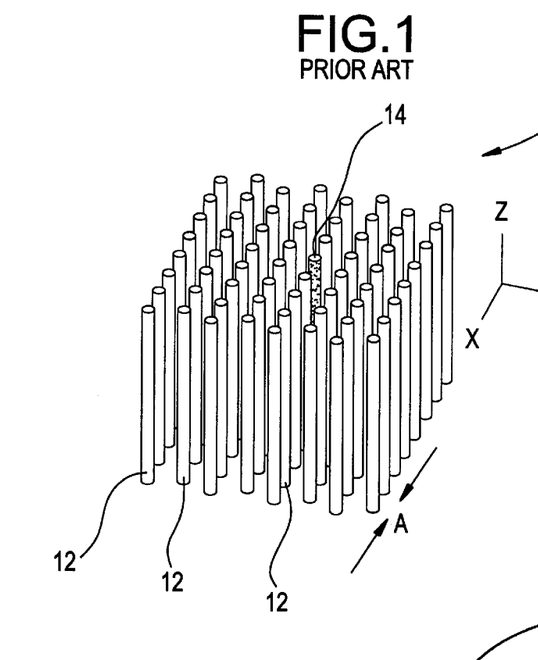
FIG. 1 is a perspective view of an exemplary two-dimensional photonic crystal structure.

An exemplary photonic crystal 10 which is periodic in two directions and homogeneous in a third is shown in FIG. 1. More specifically, photonic crystal 10 comprises a triangular lattice of dielectric columns 12, extending in the Z-axis direction, which are periodic in the X-axis and Y-axis directions (measured center to center). The photonic crystal 10 is assumed to be homogeneous in the Z-axis direction. As a result of this structure, photonic band gaps are created in the plane of periodicity (X and Y planes).

In the exemplary photonic crystal 10, the light modes will usually be oscillatory in the Z-axis direction, because the crystalline structure is homogeneous along the Z-axis.

It is also generally assumed that the light modes will only propagate through the photonic crystal in the X-Y plane. The photonic crystal 10 is also invariant under reflections through the X-Y plane. This mirror symmetry allows the modes to be classified into two distinct polarizations, namely transverse electric (TE) and transverse magnetic (TM) modes.

It is also known that a defect can be introduced into the crystalline structure for altering the planar propagation characteristics and localizing the light modes. For example, photonic crystal 10 includes a central column 14 (shown as a solid black column) comprising a dielectric material that is different from the other periodic columns 12. Additionally, the size and shape of central column 14 can be modified for perturbing the single lattice site. As a result, a single localized mode or set of closely spaced modes is permitted having frequencies within the band gap.

The characteristics of the crystalline structure produce a photonic band gap (PBG). The defect in the crystalline structure allows a path for light to travel through the crystal. In effect the central column 14 creates a central cavity which is surrounded by reflecting walls. Light propagating through the central column 14 (along the Z-axis direction) becomes trapped within the resulting photonic band gap and cannot escape into the surrounding periodic columns 12. Thus it has been demonstrated that light, whether a pulse or continuous light, can also be guided through this type of photonic band gap crystal.

Figure 2:
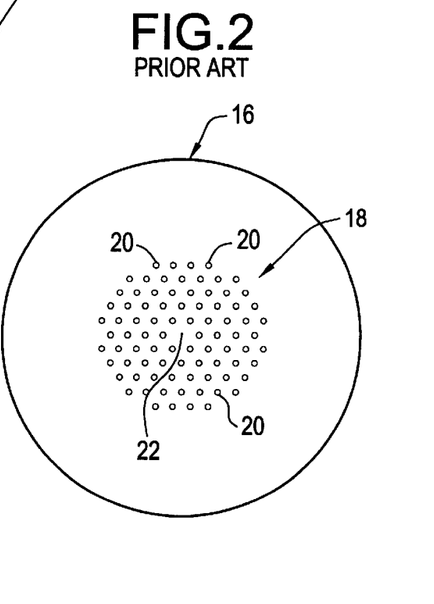
FIG. 2 is a cross-sectional view of a photonic crystal fiber known within the prior art.

An optical waveguide fiber having a photonic band gap crystal cladding region known within the prior art is shown in FIG. 2. The photonic crystal fiber (PCF) 16 includes a porous clad layer 18, containing an array of air voids 20 that serve to change the effective refractive index of the clad layer 18. This in turn serves to change the properties of the fiber 16 such as the mode field diameter or total dispersion. The air voids 20 defining the clad layer 18 create a periodic matrix around the central fiber core 22, usually formed from solid silica. The distribution of light power across the waveguide (mode power distribution) effectively determines the properties of the optical waveguide. Changing the effective index of the clad layer 18 changes the mode power distribution and thus the properties of the PCF optical waveguide 16.

The manufacture of a porous clad PCF 16 having an array of voids or pores 20 as shown is difficult because the porosity volume and distribution must be controlled in the preform. Further, the control of the PCF clad layer porosity must be maintained during drawing of the preform down to the dimensions of a waveguide fiber, such as PCF 16. The drawing step occurs at very high temperatures and the final fiber diameter is small, about 125 μm. The drawing step must therefore include maintaining a precise balance of pressure within the pore 20 against viscous forces of the materials surrounding the pore 20 under relatively extreme conditions.

Figure 3:
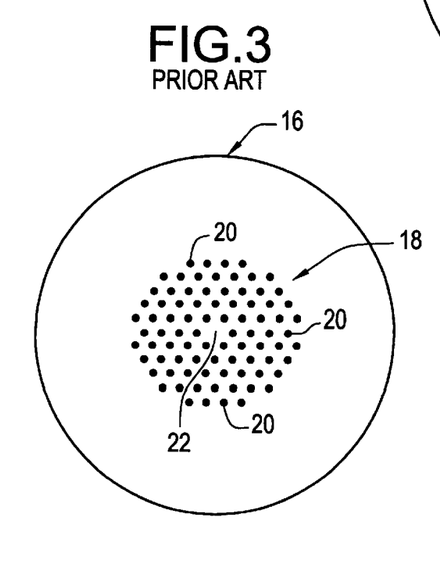
FIG. 3 is a cross-sectional view of the photonic crystal fiber of FIG. 2 showing collapse of the air holes after fusion splicing or tapering.

Another problem associated with the porous clad PCF, such as PCF 16 is illustrated in FIG. 3. More specifically, FIG. 3 shows the resulting structure of the air voids 20 forming the clad layer 18 after either fusion splicing or tapering. As shown, the size of the pore forming each air void 20 becomes constricted or closed which in turn adversely affects the properties of the fiber 16 at the splice or tapered region. Accordingly, PCF 16 is not well suited for applications in which the fiber must be spliced or tapered.

However, an advantage realized through PCF structures is that the large contrast between core and clad effective index afforded by these structures can be used to provide large effective area, thereby mitigating non-linear effects on transmitted signal integrity. In view of the advantages associated with photonic crystal fiber structures, it is desirable to provide an optical waveguide PCF which reduces the problems of "closed" air gaps within the fiber splicing region, as well as overcoming the additional problems described above and known with prior photonic crystal fiber designs.

SUMMARY OF THE INVENTION

In accordance with the teachings of the present invention, a fiber optic waveguide is disclosed. The fiber optic waveguide includes a core region, and a cladding region surrounding the core region. The cladding region includes an inner cladding region and an outer cladding region. The inner cladding region includes a plurality of ring structures forming a lattice. The core region functions as a defect in the lattice of ring structures for guiding light within the fiber optic waveguide. The core region may be formed from a high index material and the inner cladding region may be formed from a material having a refractive index lower than the refractive index of the core region. The outer cladding region is formed from a material having a refractive index equal to or higher than the refractive index of the inner cladding region.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts.

Figure 4:
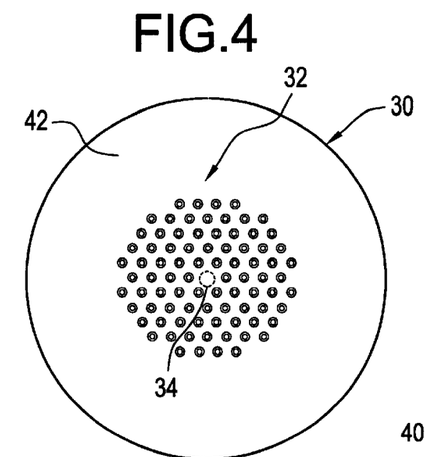
FIG. 4 is a cross-sectional view of a photonic band gap crystal fiber formed using an annular ring structure in accordance with a preferred embodiment of the present invention.

Referring now to FIG. 4, a cross-sectional view of photonic crystal fiber (PCF) 30 is shown in accordance with a preferred embodiment of the present invention. PCF 30 includes a low index inner cladding region 32 formed around a high index fiber core region 34. However, it is possible to manufacture PCF 30 to include a low index fiber core region 34 surrounded by a slightly higher index inner cladding region 32 for increasing the effects of Bragg scattering. The inner cladding region 32 comprises a periodic lattice of ring structures 36. A particular feature of PCF 30 is that the core region 34 does not include a ring structure 36. As a result, the core region 34 functions as a defect in the lattice structure for guiding light through the waveguide. The fiber core region 34 is preferably formed from silica, which has an index (n) of about n=1.45. However, the core region 34 may also be formed from doped silica for altering the index characteristics. An outer cladding region 42, preferably formed from doped silica and having an index which is at least higher than the refractive index of the inner cladding region 32, surrounds the inner cladding region 32. While not specifically shown, an absorptive polymer coating is applied to the outer surface of the fiber 30.

Figure 5:
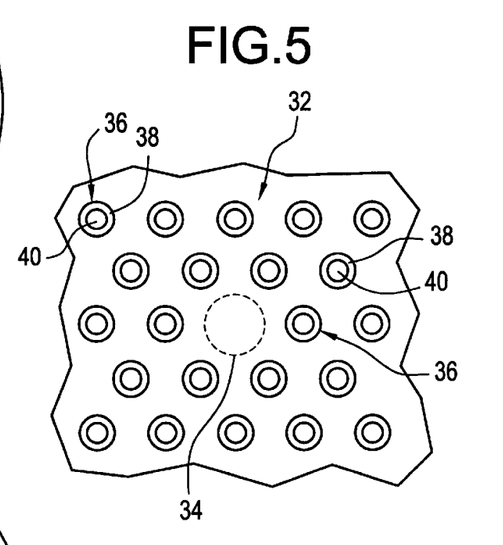
FIG. 5 is an enlarged view of the fiber of FIG. 4 showing the annular ring structures forming a portion of the cladding region.

With reference to FIG. 5, each ring structure 36 is defined by an annular ring 38 which surrounds an inner core 40. It is preferred that each annular ring 38 is formed by an annular column of solid material such as low index glass. Each inner core 40 preferably has an index which is lower than the index of the annular ring 38. The preferred composition for each inner core 40 is air or a low index material such as silica doped with fluorine or titanium. However, one skilled in the art will appreciate that a variety of materials can be used for the lattice of inner cores 40. The material for annular rings 38 can be chosen such that the ring remains more stable at higher temperatures than the material surrounding the ring 38. As will be appreciated this characteristic assists each annular ring 38 in maintaining its shape and prevents the collapse of each inner core 40 during fusion splicing or tapering when the inner core 40 is a column of air.

The resulting periodic lattice of annular ring structures 36 produces an inner cladding region 32 which has a lower index of refraction than the fiber core region 34. This is because the material forming the annular rings 38 produces an averaged index of refraction which is lower than the silica or doped silica material forming the fiber core region 34. The difference in index of refraction between the core and cladding is often referred to as index delta. As shown, the inner cladding region 32 is a triangular lattice of ring structures 36. However, one skilled in the art will appreciate that the ring structures 36 can be arranged in a variety of structures, including but not limited to square or other suitable structures.

Figure 6:
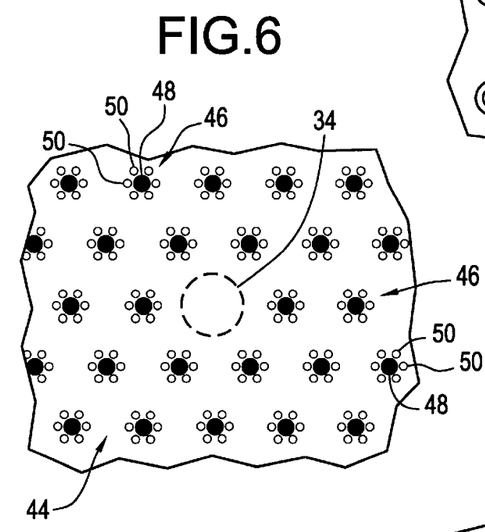
FIG. 6 is a cross-sectional view of a photonic band gap crystal structure formed using a cellular ring structure in accordance with an alternate preferred embodiment of the present invention.

Turning now to FIG. 6, a partial sectional view of an inner cladding region 44 is shown in accordance with an alternate preferred embodiment of the present invention. Inner cladding region 44 may be substituted into PCF 30 (FIG. 4) for inner cladding region 32. Inner cladding region 44 is also shown as a triangular lattice of index modifying cellular ring structures 46. Each index modifying cellular ring structure 46 includes an inner core 48 surrounded by a plurality of column structures 50 forming an index modifying shell around the core. As shown, six columns 50 form the cellular ring around each inner core 48. The columns 50 are preferably voids which form air columns along the length of the fiber 30. Alternatively, the columns 50 may be a solid material which is different from the substrate silica of the outer cladding region surrounding the columns 50 or the fiber core region 34. Preferably, each inner core 48 is formed from a material having a low index of refraction such as silica doped with fluorine or titanium. In the preferred configurations, each inner core 48 is a material which has a lower index than the surrounding silica substrate of the outer cladding region 42. Often, this material having a lower index is referred to as a negative-delta material.

Figure 7:
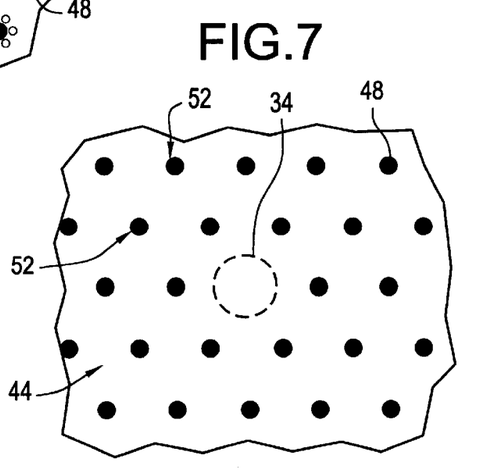
FIG. 7 is a cross-sectional view of the cellular ring structure after restriction or collapse of the ring of air holes as a result of fusion splicing or tapering.

FIG. 7 shows the cladding region 44 after the fiber 30 has been fusion spliced or tapered. More specifically, the splicing or tapering process causes the cellular ring structures 46 to constrict or fully collapse, leaving the lattice of inner cores 48. The collapsed ring structures are shown generally at 52. When the air rings or columns 50 forming the cellular ring structures 46 collapse, the index contrast within the collapsed region will not be as high as those areas where the cellular ring structures 46 are intact. Experimentation demonstrates that even a delta of −0.5% will guide light over or through the short splice or taper distance.

The resulting fibers 30 having either inner cladding region 32 or inner cladding region 44 have the following performance characteristics. For short wavelengths, the mode is essentially excluded from the annular ring structures 36 or cellular ring structures 46, and the waveguide fibers 30 having either of these cladding regions perform substantially the same. At longer wavelengths, the mode penetrates the annular ring structures 36 or cellular ring structures 46 which produces a change in fiber performance depending upon the outer diameter of the ring structure.

Figure 8:
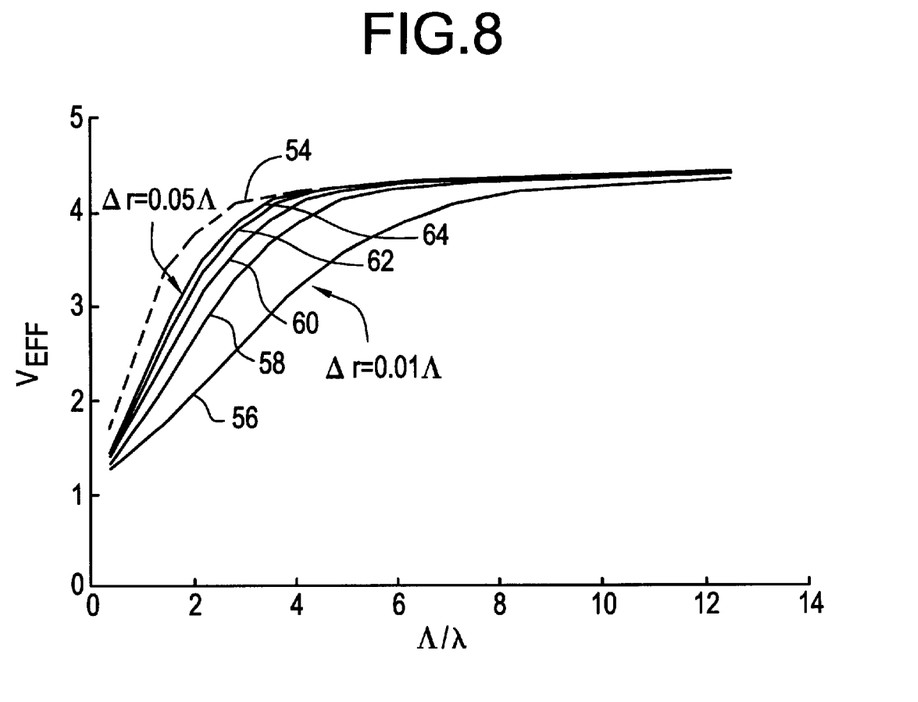
FIG. 8 is a graph associated with the optical fiber structure of FIG. 5 showing the effective V number ($V_{eff}$) as a function of the inverse scaled wavelength where $\Lambda$ (lambda) is the spacing between the annular ring structures forming the lattice.

As part of the experimental testing process, the annular ring structures 36 and cellular ring structures 46 were modeled using the plane-wave expansion (PWE) computer code. FIG. 8 shows the computed change in the effective V number ($V_{eff}$) as a function of the inverse of the scaled free-space wavelength for structures containing annular rings 38 of varying radius.

The reference dashed line curve 54 represents $V_{eff}$ as a function of the inverse scaled wavelength for a typical porous clad optical fiber, such as PCF 16 shown in FIG. 2. As described above for FIGS. 4 and 5, the porous clad layer 18 has been replaced with a periodic lattice of annular ring structures 36. In FIG. 8, Λ (lambda) is the center to center spacing between the annular ring structures 36. For dashed curve 54, each of the air columns 20 has a radius r=0.25Λ. The remaining solid line curves 56, 58, 60, 62 and 64 represent annular rings 38 having outer radii of r =0.25Λ, with ring thickness of Δr=0.01Λ, Δr=0.0279 , Δr=0.03Λ, Δr=0.04Λ, and Δr=0.05Λ, respectively.

From the graphical data of FIG. 8, it becomes apparent that at short wavelengths the curves become identical. However, at long wavelengths the curves differ, indicating slightly different performance between optical fibers having a cladding region 32 formed from the annular ring structures 36. Even for smaller radius annular rings 38, the mode remains confined. However, at shorter wavelengths the structure will have a lower numerical aperture (NA) and will become more susceptible to bend losses.

Figure 9:
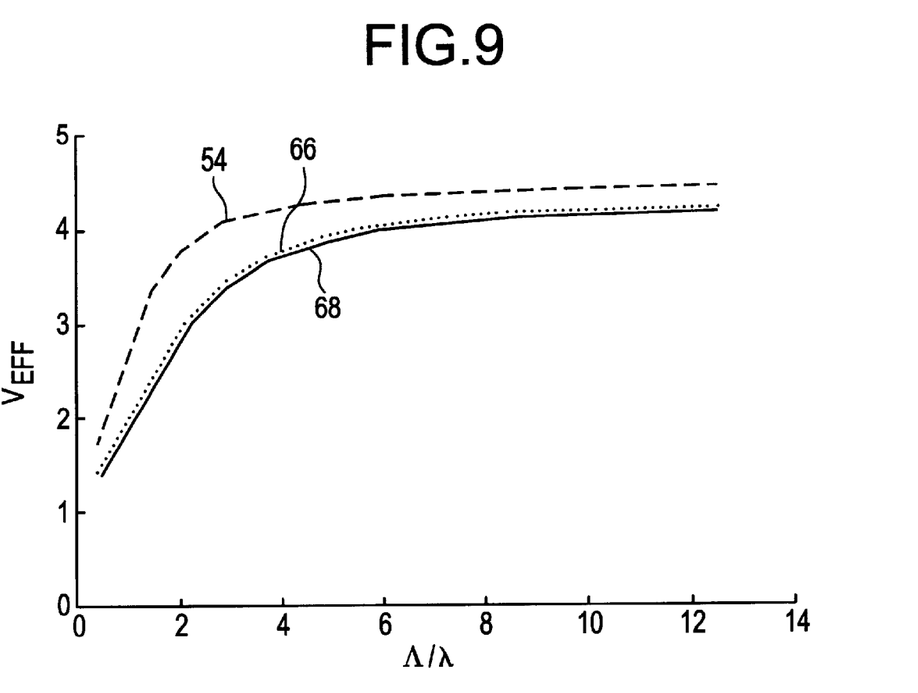
FIG. 9 is also a graph associated with the optical fiber structure of FIG. 6 showing the effective V number ($V_{eff}$) as a function of the inverse scaled wavelength where $\Lambda$ (lambda) is the spacing between the cellular ring structures forming the lattice.

FIG. 9 is a graph of the calculated variation in $V_{eff}$ for the structure shown in FIG. 6. Again, the reference dashed line curve 54 represents $V_{eff}$ as a function of the inverse scaled wavelength for a typical porous clad optical fiber, such as PCF 16 shown in FIG. 2. As described above for FIG. 6, the porous clad layer 18 has been replaced with a periodic lattice of cellular ring structures 46. In FIG. 9, Λ (lambda) is the center to center spacing between the cellular ring structures 46. For dashed curve 54, each of the air columns 20 has a radius r=0.25Λ as described above. The remaining dotted curve 66 and solid line curve 68 represent cellular ring structures 46 where each of the six small columns 50 have radii r=0.0518Λ, and the center of each column 50 is distributed about a circle of radius r=0.198Λ. Each group of six columns 50 is contained within an outer circle of radius r=0.25Λ, for comparison with the dashed curve 54. While six columns are preferred, a structure of three or more columns 50 has been shown to produce similar results. Additionally, the dotted curve 66 represents a cellular ring structure 46 having an inner core 48 formed from −0.5% F-doped silica. The solid curve 68 represents a cellular ring structure 46 having an inner core 48 formed from silica. Once again, the performance is nearly identical to the air columns 20 for short wavelengths, but differs at longer wavelengths.

As discussed above, the optical fiber structures of FIGS. 2, 5 and 6 form two-dimensional photonic crystals which are periodic in two directions and homogeneous along the length of the fiber. In the structures of FIGS. 2, 5 and 6, photonic band gaps appear for propagation along the length of the fiber. The core region 34 for either of these structures can be high index or low index for creating a defect in the periodic structure. When light is introduced into the defect forming the core region 34, light frequencies within the frequencies defined by the band gap will be reflected along the defect. For light propagating in the plane of periodicity, the light modes can be separated into two independent polarizations, each having its own band structure.

Figure 10:
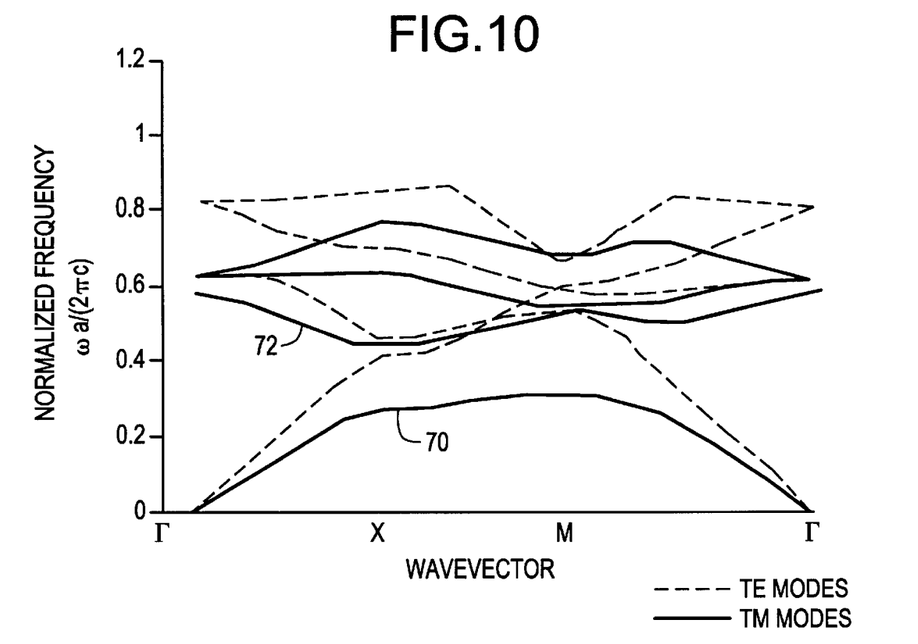
FIG. 10 is a graph showing the photonic band structure computed for the photonic crystal structure of FIG. 1 with solid cylinders.

As an example of these band gaps, FIG. 10 shows the photonic band diagram for light propagating in the X-Y plane within the structure shown in FIG. 1. For the plot in FIG. 10 the high index cylinders 12 of the structure in FIG. 1 are solid.

FIG. 10 shows that for the transverse magnetic (TM) mode, a photonic band gap exists between solid lines 70 and 72 representing the first and second bands respectively. The solid lines or bands represent TM modes and the dotted lines or bands represent transverse electric (TE) modes. Thus, a photonic crystal 10 formed by solid cylinders structures 12 has a complete band gap for the TM modes between the first and second bands, but not for the TE modes.

Figure 11:
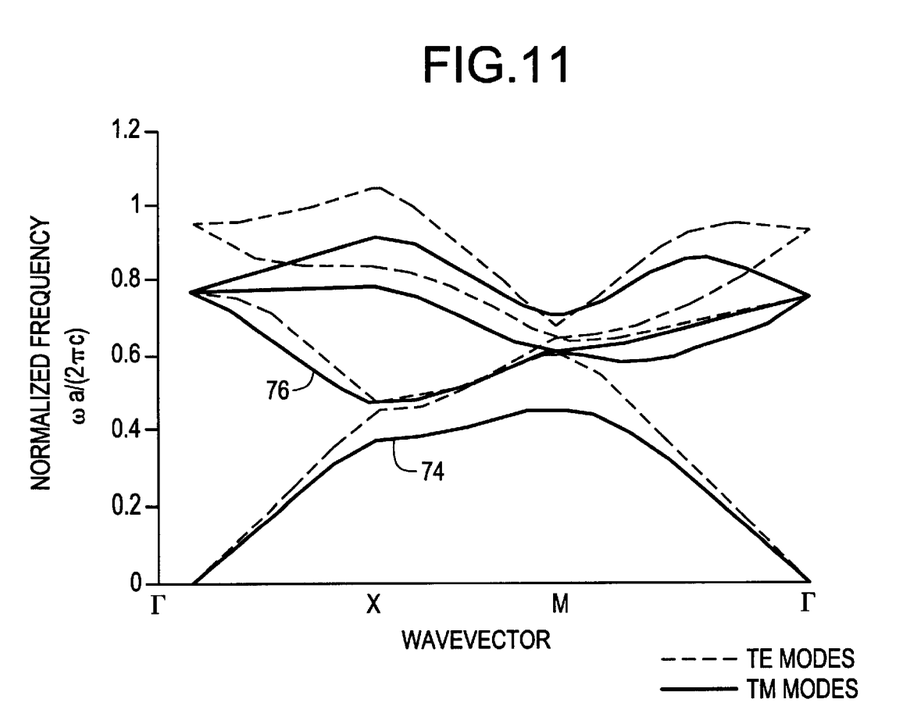
FIG. 11 is also a graph showing the photonic band structure computed for the photonic crystal structure of FIG. 1 with annular rings.

In a similar manner, FIG. 11 shows the band diagram for the photonic crystal structure of FIG. 1 where the solid columns 12 have been replaced by high index annular rings.

FIG. 11 also shows that for the transverse magnetic (TM) mode, a photonic band gap exists between solid lines 74 and 76 representing the first and second bands respectively. Thus, a photonic crystal structure 10 formed by annular ring structures also has a complete band gap for the TM modes between the first and second bands, but not for the TE modes.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claim is:

1. A fiber optic waveguide comprising:
   a core region; and
   a cladding region surrounding the core region, the cladding region including an inner cladding region and an outer cladding region, the inner cladding region is a solid material having a lattice of annular ring structures therein; such that the core region functions as a defect in the lattice of ring structures for guiding light within the fiber optic waveguide;
   each annular ring structure is formed by an annular ring surrounding an inner core, where the annular ring is a solid material having a refractive index different than the refractive index of the solid material forming the remainder of the inner cladding region and the inner core is a material having a refractive index which is lower than the refractive index of the solid material forming the annular ring.

2. The waveguide of claim 1 wherein the core region is formed from a high index material and the inner cladding region is formed from a material having a refractive index lower than the refractive index of the core region, wherein light is guided along the core region by way of total internal reflection.

3. The waveguide of claim 1 wherein the core region is formed from a low refractive index material and the inner cladding region is formed from a material having a refractive index higher than the refractive index of the core region, wherein light is guided along the core region by way of Bragg scattering.

4. The waveguide of claim 1 wherein the outer cladding region has a refractive index equal to or higher than an effective index produced by the lattice of ring structures.

5. The waveguide of claim 1 wherein the core region is a silica material and the annular rings are a low index glass.

6. The waveguide of claim 5 wherein the inner core is selected from the group consisting of air and silica doped with fluorine or titanium.

7. A fiber optic waveguide comprising:
   a core region; and
   a cladding region surrounding the core region, the cladding region including an inner cladding region and an outer cladding region, wherein the inner cladding region is a solid material having a lattice of annular ring structures formed therein, each annular ring structure being formed by an annular ring of solid material surrounding an inner core, such that the solid material of the annular ring has a refractive index different than the refractive index of the solid material forming the remainder of the inner cladding region, and the inner core is a material having a refractive index which is lower than the refractive index of the solid material forming the annular rings.

8. The waveguide of claim 7 wherein the lattice of annular ring structures exhibits an effective index of refraction which is produced by a combination of a refractive index associated with the annular ring and a refractive index associated with the inner core.

9. The waveguide of claim 8 wherein the outer cladding region is formed from a material having a refractive index equal to or higher than the effective index of refraction of the lattice of annular ring structures.

10. The waveguide of claim 7 wherein the core region functions as a defect in the lattice of annular ring structures for guiding light along the fiber optic waveguide.

11. The waveguide of claim 7 wherein the core region is formed from a high refractive index material and the inner cladding region is formed from a material having a refractive index lower than the refractive index of the core region, wherein light is guided along the core region by way of total internal reflection.

12. The waveguide of claim 7 wherein the core region is formed from a low refractive index material and the inner cladding region is formed from a material having a refractive index higher than the refractive index of the core region, wherein light is guided along the core region by way of Bragg scattering.

13. The waveguide of claim 7 wherein the core region is a silica material and the annular rings are a low index glass.

14. The waveguide of claim 7 wherein the inner core is selected from the group consisting of air and silica doped with fluorine or titanium.

15. A fiber optic waveguide comprising:
   a core region; and
   a cladding region surrounding the core region, the cladding region including an inner cladding region and an outer cladding region, wherein the inner cladding region is a solid material having a lattice of cellular ring structures formed therein, each cellular ring structure being formed by a plurality of air columns surrounding an inner core formed by a column of dielectric material, the column of dielectric material having a refractive index different than the refractive index of the solid material forming the remainder of the inner cladding region.

16. The waveguide of claim 15 wherein the inner cladding region exhibits an effective index of refraction which is produced by a combination of a refractive index associated with the annular ring and a refractive index associated with the inner core.

17. The waveguide of claim 15 wherein the outer cladding region is formed from a material having a refractive index equal to or higher than the refractive index associated with the inner cladding region.

18. The waveguide of claim 15 wherein each of the columns of dielectric material is a silica material doped with fluorine or titanium.

19. The waveguide of claim 15 wherein the core region functions as a defect in the lattice of cellular ring structures for guiding light along the fiber optic waveguide.

* * * * *

UNITED STATES PATENT AND TRADEMARK OFFICE
CERTIFICATE OF CORRECTION

PATENT NO.   : 6,334,017 B1
DATED        : December 25, 2001
INVENTOR(S)  : James A. West It is certified that error appears in the above-identified patent and that said Letters Patent is hereby corrected as shown below:

<u>Title page,</u>
Item [73], insert:
-- [73] Assignee:  Corning Incorporated,
　　　　　　　　　　Corning, New York (U.S.) --

Signed and Sealed this

Seventeenth Day of December, 2002

JAMES E. ROGAN
*Director of the United States Patent and Trademark Office*

(12) United States Patent
West (10) Patent No.: US 6,334,017 B1
(45) Date of Patent: Dec. 25, 2001

(54) RING PHOTONIC CRYSTAL FIBERS

(76) Inventor: James A. West, 1 E. Chatfield Pl., Painted Post, NY (US) 14870

( * ) Notice: Subject to any disclaimer, the term of this patent is extended or adjusted under 35 U.S.C. 154(b) by 0 days.

(21) Appl. No.: 09/426,835

(22) Filed: Oct. 26, 1999

(51) Int. Cl.$^7$ .............................. G02B 6/16; G02B 6/20
(52) U.S. Cl. ............................................. 385/123; 385/125
(58) Field of Search ..................................... 385/123–128

(56) References Cited

U.S. PATENT DOCUMENTS

| | | | |
|---|---|---|---|
| 5,278,931 | 1/1994 | Antos et al. | 385/126 |
| 5,742,722 * | 4/1998 | Imoto | 385/126 |
| 5,802,236 | 9/1998 | DiGiovanni et al. | 385/127 |
| 5,907,652 | 5/1999 | DiGiovanni et al. | 385/125 |
| 6,097,890 * | 8/2000 | Ranka et al. | 385/127 |

OTHER PUBLICATIONS

T.A. Birks et al., "Dispersion compensation using single-material fibers", IEEE Photonics Technology Letters, vol. 11, No. 6, pp. 674–676, Jun. 1999.*

Photonic crystals: putting a new twist on light; Joannopoulos/Villeneuve/Fan; Mar. 13, 1997; p. 143–149 (Nature).

Endlessly single-mode photonic crystal fiber; Birks/Knight/Russell; (Optics Letters) Jul. 1, 1997; p. 961–963.

Silica/Air Photonic Crystal Fibres; Russell/Knight/Birks/Cregan/Mangan; Jul. 10–11 1997; p. 1–4 (International Workshop on Structure and Functional Optical Properties of Silica and Silica–Related Glasses).

Microscopic Glass Fibre Crystals: the world's longest holes; Russell/Knight/Mangan/Cregan/Birks; 1998; p. 1–2 (no month available).

Properties of photonic cyrstal fiber and the effective index model; Knight/Birks/Russell/Sandro; Mar. 1998; p. 748–752 (J. Opt. Soc. Am.).

"Single–Mode Photonic Band Gap Guidance of Light in Air", Cregan, R. F., et al. Science, vol. 285, Sep. 3, 1999, Pp. 1537–1539.

* cited by examiner

Primary Examiner—Rodney Bovernick
Assistant Examiner—Michael Stahl (57) ABSTRACT

A fiber optic waveguide is provided. The fiber optic waveguide includes a core region, and a cladding region surrounding the core region. The cladding region includes an inner cladding region and an outer cladding region. The inner cladding region has a lattice of ring structures. The core region is formed from a high index material and the cladding region is formed from materials producing an effective refractive index lower than the refractive index of the core region.

19 Claims, 4 Drawing Sheets